Patented Sept. 25, 1951

2,569,300

UNITED STATES PATENT OFFICE 2,569,300

SELECTIVE OXIDATION OF STEROID ALCOHOLS

Louis F. Fieser and Srinivasa Rajagopalan, Cambridge, Mass.; said Fieser assignor to Research Corporation, New York, N. Y., a corporation of New York, and said Rajagopalan assignor to the United States of America as represented by the Administrator of the Federal Security Agency No Drawing. Application June 15, 1949,
Serial No. 99,342

7 Claims. (Cl. 260—397.1)

This invention relates to a novel method of effecting the selective oxidation of alcoholic groups occupying specific positions in the steroid molecule.

The general purpose of the invention is to provide an efficient method for the production of carbonyl compounds, of use as intermediates in the partial or total synthesis of steroid hormones or vitamins, or which themselves constitute such final products. The specific purpose is to provide a method for the selective oxidation of an alcoholic group in a molecule containing other oxidizable groups.

Hitherfore two methods have been available for effecting the type of transformation outlined. One consists in protecting certain oxidizable groups through acyl derivatives obtainable by processes of selective acylation or saponification, but the method is limited to those cases where suitable acyl derivatives are available, and the success of the process is dependent upon this factor and not upon the method and technique of oxidation. The second method consists in treatment of a polyfunctional alcohol under controlled conditions with a limited amount of an oxidizing agent that is capable of attacking all of the primary or secondary alcoholic groups that may be present but that attacks some one group or set of groups more rapidly than it attacks others.

All of the processes of partial oxidation known to the prior art have in common the sometimes objectionable feature that the reagent employed to effect a desired oxidation of one of the alcoholic functions is capable of effecting oxidation of another alcoholic function or functions under the same or similar conditions. In conducting an experiment with a known amount of a substance such as cholic acid, it is necessary therefore to provide adequate control of time, temperature, solvent, and/or amount of oxidizing agent in order to achieve success. Thus cholic acid can be oxidized with chromic acid or dichromate to give as the principal product either $3\alpha,12\alpha$-dihydroxy-7-ketocholanic acid, $3\alpha$-hydroxy-7,12-diketocholanic acid, or dehydrocholic acid, according to the conditions; for example, under exactly the same conditions one, two, or three of the alcoholic groups of cholic acid can be oxidized, according to the amount of bromine employed. If the amount of cholic acid in the sample submitted to oxidation is not known, then it is evident that any method dependent upon the use of a controlled amount of oxidizing agent is not applicable to efficient operation.

We have now discovered a new method of oxidation that not only affords improved yields in the oxidation of known amounts of polyalcoholic compounds but also has the great advantage of being free from the objection inherent in the previous methods cited. It therefore increases the scope of application and makes possible certain useful operations not hitherto realizable.

Our method consists in oxidizing a mono or polyalcoholic steroid with a cyclic N-halo-imide, such as the N-bromo- and N-chloro- derivatives of imides of aliphatic and aromatic dicarboxylic acids, for example, N-bromosuccinimide or N-bromophthalimide, in an aqueous alkaline solution, for example, sodium bicarbonate solution, or in an organic solvent, or combination of solvents, containing water, for example aqueous dioxane, or aqueous ether-methanol. The choice of solvent is not a critical factor, for solvents of a wide variety, even some that are susceptible to ordinary oxidizing agents, may be employed. Neither is the temperature a critical factor, for we have found that the oxidations often proceed smoothly and rapidly at room temperature, and that some proceed smoothly with spontaneous temperature rise. Finally, and of great importance, is the fact that the amount of oxidizing agent is not a critical factor, provided, of course, that the amount is sufficient to accomplish the particular transformation desired.

By this new method we have succeeded in oxidizing cholic acid to $3\alpha,12\alpha$-dihydroxy-7-ketocholanic acid in yield distinctly higher than previously reported. Since the isolation of the keto acid, preferably as the ethyl ester, is attended with some losses, the best measure of the full yield in the oxidation step is afforded by Wolff-Kishner reduction according to Huang-Minlon, J. Am. Chem. Soc., 68, 2487 (1946) and isolation of the resulting desoxycholic acid as the ether complex; desoxycholic acid of high purity can be prepared with great ease. We have conducted this and related oxidations in various solvents but for reasons of ease and economy of solvent prefer to oxidize cholic acid in aqueous sodium bicarbonate solution, and under these conditions desoxycholic acid can be prepared regularly in overall yields as high as 68%. No substantial difference in yield was observed in oxidations conducted with 1.25, 1.5, or 2.0 moles of the N-haloimide. N-halosuccinimides, unlike other reagents that have been applied to the problem, do not merely attack cholic acid preferentially at $C_7$, but attack this position and, under the same conditions, leave $C_3$ and $C_{12}$ untouched.

This specificity is well demonstrated by an example in which desoxycholic acid was treated with 1.25 moles of N-bromosuccinimide under the exact conditions of the cholic acid oxidation and was recovered completely unchanged. This bicyclic haloimide thus has entirely different characteristics from all of the reagents cited above and also from the seemingly similar N-bromoacetamide, which has found some use in the oxidation of steroid alcohols. (See for example, Lardon, Helv. Chim. Acta, 30, 597 (1947).)

Because of its unique specificity, the new oxidation procedure can be applied advantageously in ways not feasible by previous methods. A particularly useful example is in the following process for producing desoxycholic acid in greatly increased yield from bile. The precipitated, dark colored total acids from the saponification of a mamalian bile contains a considerable amount of cholic acid, a lesser amount of desoxycholic acid, and minor amounts of such other bile acids as lithocholic acid and chenodesoxycholic acid, together with incidental contaminants. The results cited above show that desoxycholic acid is not altered by treatment with N-bromosuccinimide and that cholic acid is oxidized satisfactorily at $C_7$ even though an excess of the reagent is present, and we have found that oxidation of the total crude bile acid precipitate with enough N-bromosuccinimide to take care of the maximum possible amount of cholic acid present, followed by reduction as usual, affords desoxycholic acid of high purity. Actually the minor bile acids and the incidental impurities are eliminated in the course of the ordinary processing and with no extra operations. The steps of separating and purifying the two major acids of bile hydrolyzate can thus be dispensed with. The yield of desoxycholic acid obtainable from bile is about 34% higher than if the components were separated by the usual procedures and the cholic acid converted into desoxycholic acid by the present improved method of oxidation and reduction; the yield by the present method is over twice that realizable by separation of the components and application of previous methods of oxidation and reduction.

A further example of the usefulness of our new method is the oxidation of cholestane-3$\beta$,5$\alpha$,6$\beta$-triol with N-bromosuccinimide in various aqueous-organic solvent mixtures to cholestane-3$\beta$,5$\alpha$-diol-6-one. Our experiments indicate a slight preference for conducting the oxidation in an ether-methanol-water mixture, for in this case a 96.5% yield of pure oxidation product is easily realized. However, other solvent mixtures are almost equally satisfactory. The reaction demonstrates high selectivity of attack of a 6$\beta$-hydroxyl group; in this instance the alcoholic function at $C_3$ that remains unchanged has the $\beta$-orientation. The contrast between our method and the previously applied method of oxidation of cholestane-3$\beta$,5$\alpha$,6$\beta$-triol with chromic acid is shown by the fact that the latter reaction readily affords cholestane-3,6-dione-5$\alpha$-ol and gives cholestane-3$\beta$,5$\alpha$-diol-6-one in moderate yield only under special conditions of control. In our method no control whatsoever is required, for the same high yield results even when 100% excess reagent is employed.

These examples serve merely to illustrate the nature and special advantages of the oxidation procedure, but they in no way define its scope. Numerous other useful applications can be made of the fundamental discovery.

*Example I*

*Oxidation in aqueous alkaline solution.—Preparation of desoxycholic acid.*—Eighty g. of technical cholic acid (M. P. 195–197°) is dissolved by warming in a solution of 50 g. of sodium bicarbonate in 1.6 l. of tap water and the solution is cooled to 25°, treated with 43.7 g. (1.25 equiv.) of N-bromosuccinimide and shaken occasionally until the reagent has all dissolved (about one and one-half hours). The yellow solution is allowed to stand at 25° for about seventeen hours, heated on the steam bath for one hour, cooled in ice, and acidified with dilute hydrochloric acid (1:2) added slowly with vigorous stirring and scratching. The keto acid separates as a white, granular solid and after cooling in ice for one-half hour it is collected, washed well with water, dried superficially between filter papers, transferred to a 1-l. round-bottomed flask with a ground joint and dried by evaporation to dryness with methanol (500 cc.; this saves time in the next step).

The flask is then charged with 600 cc. of triethylene glycol, 90 cc. of 86% hydrazine solution (the amount can be reduced to about 2 equivalents), and 70 g. of potassium hydroxide pellets, and heated cautiously under reflux in an oil bath to a temperature of about 130° (thermometer suspended through condenser), when a vigorous exothermic reaction sets in. The flask is removed from the bath a few times until the frothing has subsided and then the mixture is refluxed gently for one-half hour; the condenser is removed and distillation conducted until the temperature has risen to 190°, and refluxing is continued for two to three hours at 190–200°. The solution is cooled, diluted with tap water to about 2 l., and acidified with 1:2 hydrochloric acid. On standing overnight the crude desoxycholic acid becomes granular and can be filtered easily. It is washed well, dried between filter papers, and then dried by evaporation with 500 cc. of methanol nearly to dryness (toward the end with a current of air). The residue while still warm is dissolved in 500 cc. of warm absolute ethanol and the solution allowed to stand at room temperature for one-half hour for separation of a trace of impurity, and filtered by gravity (100 cc. of ethanol for washing). The clear yellowish filtrate is evaporated to dryness as before (air current) and the slightly brown residual syrup is treated with 400 cc. of dry ether and alternately shaken and briefly heated until the gum has dissolved and given rise to a precipitate of desoxycholic acid etherate (unreacted lumps can be broken up with a flattened rod). After three or four hours with occasional shaking, the white etherate is collected, washed with 150–200 cc. of dry ether, and dried at 90–100° in vacuum for one-half hour. The etherate melts unsharply above 145°; some samples partly melt, resolidify, and remelt to a clear liquid at 170–173°. The average yield in three concordant experiments was 53 g. (68% calculated for etherate of mol. wt. 400).

For conversion to free desoxycholic acid the above complex is heated on the steam bath with 2.5 l. of tap water with stirring for one and one-half hours, when the solid partly melts and then resolidifies. The mixture is cooled and the acid collected, triturated with cold water in a mortar, collected, and dried in vacuum at 100–110° for two hours. The white solid melts at 170–172°; average yield 51.8 g. (68%).

*Isolation of 3$\alpha$,12$\alpha$-dihydroxy-7-ketocholanate.*—The crude oxidation mixture from 80 g.

of cholic acid is dehydrated by evaporation with 400 cc. of methanol, refluxed with 400 cc. of absolute ethanol and 12 cc. of boron fluoride etherate for three hours, and the solution concentrated to half its volume and poured into water. The dark brown gummy product is washed and rubbed repeatedly with water and with bicarbonate solution and evaporated with 300 cc. of methanol. The resulting solid is dissolved in 300 cc. of methanol, when the solution slowly deposits a crop of small crystals of the keto ester of high purity, M. P. 158–159°; yield 34 g. (40%).

The dark mother liquor and washings can be evaporated and the dark red gummy residue reduced according to Huang-Minlon and the mixture processed for recovery of desoxycholic acid etherate by the usual procedure. The yield of pure complex is 27 g.

Example II

*Desoxycholic acid from total bile acids.*—One hundred g. of the total acid precipitate prepared by saponification of 198 g. of a 75% sheep bile concentrate with refluxing alkali for eighteen hours and acidification is dissolved in 1.5 l. of water containing 65 g. of sodium bicarbonate and treated with 56 g. of N-bromosuccinimide at 25°. The initially dark solution improves in color as the oxidation progresses. After twenty-four hours the light greenish yellow solution is filtered by gravity from a fine gray solid and acidified, and the rubbery precipitate is kneaded with water and submitted to reduction with 110 cc. of 85% hydrazine, 700 cc. of triethylene glycol, and 85 g. of potassium hydroxide. The rest of the processing is done as in Example I except that the desoxycholic acid etherate is ground in a mortar with ether before the final collection. The complex is nearly colorless and melts at 175–177°, after shrinking at 145–155°; yield 41.5 g. The reddish-brown ethereal mother liquor was not worked up further. The yield corresponds to 21.7 g. of free desoxycholic acid per 100 g. of sheep bile concentrate. By the usual methods of separation, 100 g. of concentrate yields about 4.4 g. of desoxycholic acid and 16.8 g. of cholic acid, convertible into 10.9 g. of desoxycholic acid by our process to give a total of 15.3 g. of the acid.

Example III

*Oxidation of cholic acid in aqueous acetone.*—A solution of 40 g. of cholic acid in 1 l. of acetone is diluted with 400 cc. of water and treated with 21.8 g. of N-bromosuccinimide at room temperature. After standing overnight the mixture is diluted with water and the crude solid collected and submitted to Wolff-Kishner reduction as in Example I. Desoxycholic acid etherate of high purity is obtained in yield of 27.4 g. (70%). Oxidation of methyl cholate in the same way with 1.25, 1.5, and 2.0 equivalents of N-bromosuccinimide gave the etherate in yields of 68, 68, and 63%, respectively.

Example IV

*Oxidation with N-bromophthalimide.*—Oxidation of methyl cholate in aqueous acetone with 1.25 equivalents of N-bromophthalimide and reduction, exactly as in Example 5 afforded desoxycholic acid etherate in 68% yield.

Example V

*Oxidation of cholestane-3β,5α,6β-triol:*

(a) *In aqueous dioxane.*—A solution of 10 g. of triol in 90 cc. of dioxane is diluted with 10 cc. of water, cooled to 25°, and treated with 4.5 g. (1.05 equiv.) of N-bromosuccinimide, which promptly dissolves. In the course of three to four minutes the color changes to yellow, deep orange, light yellow, and colorless, and the reaction product begins to separate. The temperature is kept at 25° by cooling, and after ten minutes the mixture is cooled in ice and the diolone collected and washed with 50% methanol; the fully dried cholestane-3β,5α-diol-6-one weighs 6.7 g., M. P. 232–233°, dec. The mother liquor is diluted with water and extracted with ether, and the washed and dried solution is concentrated until crystals of the diolone begin to separate, and a further crop of 2.5 g. of ketone of satisfactory purity is obtained; total yield of material, M. P. 231–233°, dec., 9.2 g. (93%).

In an experiment conducted without the addition of water the reaction is slow and the reaction product is obtained in low yield and very inferior quality.

(b) *In aqueous methanol-ether.*—A 1-l. separatory funnel is charged with 23 g. of the triol, 450 cc. of ether, 75 cc. of methanol, 75 cc. of water, and 10.8 g. (1.05 equiv.) of N-bromosuccinimide and shaken to effect solution. Oxidation is over in a few minutes and gives an orange-yellow solution. On addition of water the color becomes lighter and the bulk of the diolone separates from the organic phase as colorless, shiny needles. The water phase is tapped off and the suspension in ether washed with bisulfite solution, with alkali, and with water. The ketone is then collected on a Buchner funnel and washed with ether to give a first crop of 19 g. of cholestane-3β,5α-diol-6-one, M. P. 232–233°, dec. Successive concentrations of the mother liquor afford two additional crops amounting to 3 g., M. P. 232–233°, dec.; total yield 22 g. (96.5%). In parallel experiments on one-tenth the above scale with 1.05 and with 2.1 equivalents of N-bromosuccinimide, the yield of product in the first crop was 1.94 g. (M. P. 231–232°) and 1.91 g. (M. P. 231–232°), respectively.

Example VI

*Oxidation of cholestane-3β,5α,6β-triol 3-acetate.*—A mixture of 400 mg. of cholestane-3β,5α,6β-triol 3-acetate and 200 mg. (1.3 equiv.) of N-bromosuccinimide is dissolved in 15 cc. of acetone by slight warming, cooled to 25° and treated with 1 cc. of water. The solution turns pale yellow in one or two minutes, crystals begin to separate in ten minutes, and the yellow color disappears in twenty-five minutes. After a total of one and one-half hours 10 cc. of water is added and the precipitated solid collected; yield of cholestane-3β,5α-diol-6-one 3-acetate, 370 mg. (93%), M. P. 229–230°; recrystallized: M. P. 232–233°.

We claim:

1. A method of oxidizing steroid alcohols having a hydroxyl group in at least one of the positions 6 and 7, which comprises subjecting such steroid alcohols to the action of a cyclic N-halo-imide in an aqueous medium until substantially all of the hydroxyl groups in said positions are oxidized to ketone groups.

2. A method selectively oxidizing steroid alcohols having a hydroxyl group in at least one of the positions 6 and 7 and a hydroxyl group attached to at least one other ring carbon atom, which comprises subjecting such steroid alcohols to the action of a cyclic N-halo-imide in an aqueous medium until substantially all of the hydroxyl groups in said positions are oxidized to ketone groups.

3. A method of selectively oxidizing $C_6$- and $C_7$-steroid alcohols to the corresponding ketones which comprises subjecting such steroid alcohols to the action of a cyclic N-halo-imide in an aqueous medium until the hydroxyl groups in positions 6 and 7 are substantially completely oxidized.

4. In the production of desoxycholic acid, the step which comprises subjecting bile acids containing both cholic and desoxycholic acids to the action of a cyclic N-halo-imide in an aqueous medium.

5. In the production of desoxycholic acid, the step which comprises subjecting bile acids containing both cholic and desoxycholic acids to the action of N-bromosuccinimide in an aqueous medium.

6. The method which comprises subjecting cholestane-3,5,6-triol to the action of a cyclic N-halo-imide in an aqueous medium and recovering the cholestane-3,5-diol-6-one thereby produced.

7. The method which comprises subjecting cholestane-3,5,6-triol to the action of N-bromosuccinimide in an aqueous medium and recovering the cholestane-3,5-diol-6-one thereby produced.

LOUIS F. FIESER.
SRINIVASA RAJAGOPALAN.

REFERENCES CITED

The following references are of record in the file of this patent:

UNITED STATES PATENTS

| Number | Name | Date |
|---|---|---|
| 2,321,598 | Hoehn | June 15, 1943 |
| 2,471,697 | Minlon | May 31, 1949 |